United States Patent
Kim et al.

(10) Patent No.: US 8,064,704 B2
(45) Date of Patent: Nov. 22, 2011

(54) HAND GESTURE RECOGNITION INPUT SYSTEM AND METHOD FOR A MOBILE PHONE

(75) Inventors: Sang Heon Kim, Gumi-si (KR); Tea Sul Kim, Jeollabuk-do (KR)

(73) Assignee: Samsung Electronics Co., Ltd., Maetan-dong, Yeongtong-gu, Suwon-si, Gyeonggi-do, Korea (KR)

( * ) Notice: Subject to any disclaimer, the term of this patent is extended or adjusted under 35 U.S.C. 154(b) by 1167 days.

(21) Appl. No.: 11/827,272

(22) Filed: Jul. 11, 2007

(65) Prior Publication Data
US 2008/0089587 A1 Apr. 17, 2008

(30) Foreign Application Priority Data
Oct. 11, 2006 (KR) .................. 10-2006-0099062

(51) Int. Cl.
*G06K 9/46* (2006.01)

(52) U.S. Cl. ......... 382/190; 382/100; 382/103; 382/209

(58) Field of Classification Search .................. 382/100, 382/103, 190, 209
See application file for complete search history.

(56) References Cited

U.S. PATENT DOCUMENTS

| | | | |
|---|---|---|---|
| 6,181,778 B1 * | 1/2001 | Ohki et al. ...................... 379/52 |
| 6,476,834 B1 * | 11/2002 | Doval et al. ..................... 715/863 |
| 6,477,239 B1 * | 11/2002 | Ohki et al. ........................ 379/52 |
| 7,046,232 B2 * | 5/2006 | Inagaki et al. ................. 345/158 |
| 7,366,645 B2 * | 4/2008 | Ben-Arie et al. .................. 703/6 |
| 7,379,563 B2 * | 5/2008 | Shamaie ....................... 382/103 |
| 7,702,130 B2 * | 4/2010 | Im et al. ........................ 382/103 |
| 2004/0196400 A1 * | 10/2004 | Stavely et al. ........... 348/333.01 |
| 2008/0219502 A1 * | 9/2008 | Shamaie ....................... 382/103 |
| 2008/0244465 A1 * | 10/2008 | Kongqiao et al. ............. 715/863 |

FOREIGN PATENT DOCUMENTS

| KR | 2005-68663 | 7/2005 |
|---|---|---|
| KR | 2005-120932 | 12/2005 |

* cited by examiner

*Primary Examiner* — Stephen Koziol
(74) *Attorney, Agent, or Firm* — Cha & Reiter, LLC

(57) ABSTRACT

A handheld gesture recognition control apparatus and its method are provided for a mobile phone. The input method of the present invention includes collecting a plurality of images; storing the images as control images; mapping the control images to corresponding control commands; capturing an image taken by a camera as a current image; comparing the current image to the control images; selecting one of the control images as a target control image according to a comparison result; extracting a control command mapped to the target control image; and executing the control command.

14 Claims, 6 Drawing Sheets

| | | | |
|---|---|---|---|
| 1 | | POINTER ACTIVATION | ACTIVATE POINTER ON SCREEN |
| 2 | | Z AXIS INTER-LAYER NAVIGATION | NAVIGATE BETWEEN LAYERS ALONG Z AXIS |
| 3 | | VIRTUAL WORK SPACE NAVIGATION | NAVIGATE BETWEEN WORK SPACES ON IDENTICAL LAYER |
| 4 | | OBJECT FLIP | FLIP OBJECT ON IDENTICAL LAYER |
| 5 | | LEFT CLICK | PERFORM LEFT CLICK EVENT OF POINTER |
| 6 | | RIGHT CLICK | PERFORM RIGHT CLICK EVENT OF POINTER |

FIG. 3

| 1 | | POINTER ACTIVATION | ACTIVATE POINTER ON SCREEN |
|---|---|---|---|
| 2 | | Z AXIS INTER-LAYER NAVIGATION | NAVIGATE BETWEEN LAYERS ALONG Z AXIS |
| 3 | | VIRTUAL WORK SPACE NAVIGATION | NAVIGATE BETWEEN WORK SPACES ON IDENTICAL LAYER |
| 4 | | OBJECT FLIP | FLIP OBJECT ON IDENTICAL LAYER |
| 5 | | LEFT CLICK | PERFORM LEFT CLICK EVENT OF POINTER |
| 6 | | RIGHT CLICK | PERFORM RIGHT CLICK EVENT OF POINTER |

HAND GESTURE RECOGNITION INPUT SYSTEM AND METHOD FOR A MOBILE PHONE

CLAIM OF PRIORITY

This application claims the benefit under 35 U.S.C. §119 (a) of Korean Patent Application filed in the Korean Intellectual Property Office on Oct. 11, 2006 and assigned Serial No. 2006-0099062, the entire disclosure of which is hereby incorporated by reference.

BACKGROUND OF THE INVENTION

1. Field of the Invention

The present invention relates to a mobile phone and, in particular, to a handheld gesture recognition input system and its method for a mobile phone.

2. Description of the Related Art

As mobile phones integrate various multimedia modules and functions, different input technologies have been developed for enhancing the convenience of a user's manipulation. Among them keypad, touchscreen, and speech recognition based input technologies that are currently available.

A keypad input system is a well known solution, in which a plurality of keys is arranged on a keypad such that pressing a series of keys generates a mobile phone-recognizable instruction.

A touchscreen input system has been offered as an alternative manual input method and collects coordinates generated by touch events on a touchscreen, then recognizes an input signal by comparing the coordinates of the images on the screen.

A speech recognition input system is another alternative input system. The speech recognition input system analyzes a voice input and generates a mobile phone-recognizable instruction corresponding to the voice input through a microphone. Although the keypad, touchscreen, and speech recognition input systems are useful, they have implementation limits in mobile phones. That is, the keypad input system has a limit of securing enough space for arranging a plurality of keys, and also the touchscreen input system has a key event generation portion limited by the touchscreen. In the speech recognition system, recognition reliability is very dependent on the noise environment, and a high accuracy is required for matching input speech against a stored representation.

For these reasons, there is a need for developing a novel input technology for a space-limited mobile phone that is capable of facilitating information conveyance as well as mobile phone control.

SUMMARY OF THE INVENTION

The present invention has been made in an effort to solve the above problems and provides additional advantages, by providing a hand gesture recognition input system and its method for use in a mobile phone that are capable of facilitating information conveyance and mobile phone controls by matching finger gestures against the stored gestures.

It is another aspect of the present invention to provide a hand gesture recognition input system and its method for a mobile phone that are capable of efficiently utilizing the limited size screen of a mobile phone by displaying application windows in a 3-dimensional manner in association with a hand gesture recognition.

In accordance with another aspect of the present invention, an input method includes collecting a plurality of images; storing the images as control images; mapping the control images to corresponding control commands; capturing an image taken by a camera as a current image; comparing the current image to the control images; selecting one of the control images as a target control image according to a comparison result; extracting a control command mapped to the target control image; and executing the control command.

Preferably, selecting on of the control images as a target control image includes determining whether a difference offset between the current image and the control images are less than a first threshold offset; selecting the control images of which difference offset with the current image as candidate control images; determining whether a difference offset between the current image and the candidate control images are less than a second threshold offset; and selecting, if there is a candidate control image of which difference offset with the current image, the candidate control image as the target control image.

Preferably, the control images are hand gesture images.

Preferably, the control commands are commands for controlling the pointer operations on a screen of the mobile phone.

Preferably, the pointer operations include a pointer activation, inter-layer navigation, inter-window navigation on an identical layer, object flip, left click, and right click, in a three-dimensional coordinate space defined with x, y, and z axes.

Preferably, mapping the control images to corresponding control commands includes building a lookup table having an index field, a control image field, and a control command field, filled out by indexes from 1 to n, control images, and control commands, respectively.

Preferably, executing the control command includes turning on a screen of the mobile phone; activating menu windows on the screen; activating a pointer; and controlling the pointer to execute a specific operation in association with the menu windows.

Preferably, the screen is implemented with a virtual three-dimensional space having a depth such that the menu windows are arranged in different depths or are arranged in the form of perspective view.

Preferably, the screen presents shortcut icons for executing application programs, a navigation icon for indicating a current user view, and an icon list representing menu windows on a currently activated layer.

In accordance with yet another aspect of the present invention, an input system includes a camera for taking images to be used as control images and capturing an input image; a memory for storing the control images and control commands mapped to the control images and for temporarily storing the input image; a screen for displaying at least one menu window and operations of the menu window in accordance with the control commands; and a controller for controlling the menu window operation in accordance with a control command selected by comparing the input image and the control images.

Preferably, the controller includes an image generator for generating the control images from images taken by the camera; a control image mapper for mapping the control images to the control commands; an image comparator for selecting a target control image by comparing the input image with the control images; and a control image adapter for executing the control commands mapped to the target control image.

Preferably, the screen is implemented with a virtual three-dimensional space having a depth such that the menu windows are arranged in different depths or are arranged in the form of a perspective view.

Preferably, the screen presents shortcut icons for executing application programs, a navigation icon for indicating a current user view, and an icon list representing menu windows on a currently activated layer.

Preferably, the controller controls a pointer for operations of the menu windows.

Preferably, the control command comprises a pointer activation command, inter-layer navigation command, inter-window navigation command, object flip command, left click command, and right click command, in a three-dimensional coordinate space defined with x, y, and z axes.

BRIEF DESCRIPTION OF THE DRAWINGS

The above features and advantages of the present invention will be more apparent from the following detailed description in conjunction with the accompanying drawings, in which:

FIG. 3 is a lookup table illustrating mappings between control images and control commands according to an embodiment of the present invention;

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention. Further, the drawings and description are to be regarded as illustrative in nature and not restrictive.

According to the teachings of the present invention, the hand gesture images are matched with specific instructions or alphanumeric characters for operating the mobile phone. The hand gesture images can be replaced with images having other tools whose matching offsets are within a tolerable matching offset range. It should be noted that the hand gesture images can be extended to other types of gesture images and images using other tools. Also, in the present invention, a hand gesture image taken by a camera is used for inputting user instructions. However, the present invention is not limited to the hand gesture image, but can extend to images having special symbols formed by using other tools.

Moreover, the hand gesture recognition input system and method of the present invention is described in association with an operation of a pointer on the screen, however, the instructions input by the hand gesture recognition input system and method can operates other applications installed in the mobile phones. The hand gestures can be matched to various control instructions such as keyboard input instructions, keypad input instructions, menu control instruction, system on/off instruction, call control instructions especially for a mobile phone.

Furthermore, a mobile phone is used for explaining the hand gesture recognition input system and method. However, the hand gesture recognition input system and method can be used with other devices that have a camera for taking an images and memory for storing representative images matching corresponding instructions. For example, the hand gesture recognition input system and methods can be implemented with information processing devices such as a cellular phone, Digital Multimedia Broadcasting (DMB) receiver, Personal Digital Assistant (PDA), Smartphone, International Mobile Telecommunication 2000 (IMT-2000) terminal, Wideband Code Division Multiple Access (WCDMA) terminal, and Universal Mobile Telecommunication Service (UMTS) terminal.

Figure 1:
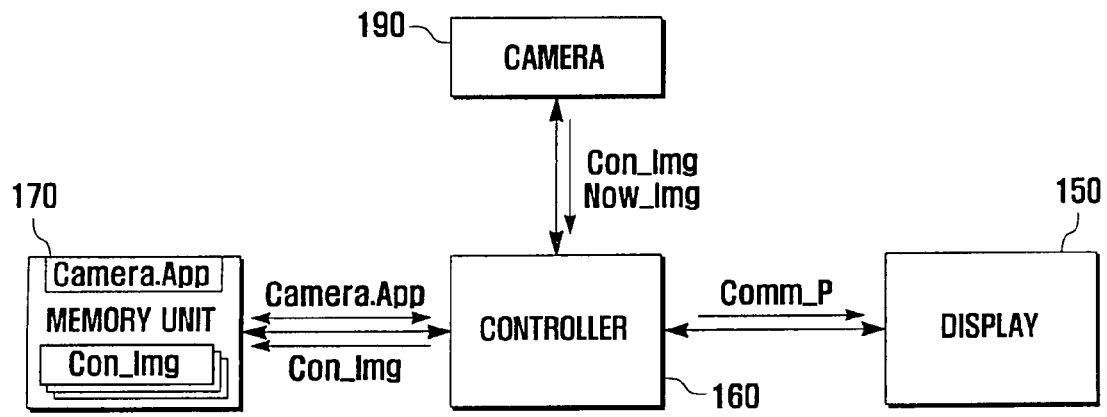
FIG. 1 is a block diagram illustrating a hand gesture recognition input system for a mobile phone according to an embodiment of the present invention.

FIG. 1 is a block diagram illustrating a hand gesture recognition input system for a mobile phone according to an embodiment of the present invention.

Referring to FIG. 1, the hand gesture recognition input system includes a camera 190, memory unit 170, display 150, and controller 160.

In operation, the camera 190 captures an image and converts the image into a digital signal by means of an encoder (not shown). In this embodiment, a plurality of hand gestures captured by the camera is stored as control images (Con_Img). For obtaining various hand gesture control images, the camera 190 can capture motion images as well as still images and temporarily store the images in a buffer memory. The control images (Con_Img) are mapped to specific control commands (Comm_P) so as to be used for a pointer manipulation on a screen.

The memory unit 170 stores a plurality of application programs for operating functions of the mobile phone including camera operation application (Camera.App), and the control images (Con_Img). The memory unit 170 includes a program memory region and a data memory region.

The program memory region stores an operating system (OS) for managing hardware and software resources of the mobile phone, and application programs for operating various functions associated with multimedia contents such as sounds, still images, and motion pictures, and camera operation applications. The mobile phone activates the applications in response to a user request under the control of the controller 160.

The data memory region stores data generated while operating the applications, particularly the control images (Con_Img) in corporation with the camera operation application. A portion of the data memory region can be used as the buffer memory for temporarily storing the images taken by the camera 190.

The display 150 has a screen for displaying various menus for the application programs and information input or requested by a user. The display 150 also displays still or motion images taken while viewing an image projected on a camera lens. The display 150 can be a liquid crystal display (LCD). In a case when the LCD is implemented with a touchscreen, the display 150 can be used as an additional input means. The display 150 can display menu windows associated with the application programs so as to allow the user to select options for operating the application programs. In this embodiment, the menu windows can be displayed in a three-dimensional manner. This will be described in association with the operation of the controller 160.

The controller 160 controls the overall operation of the mobile phone and cooperation between the elements constituting the mobile phone. The controller 160 can be implemented with a modem and codec for operating a communication function. Particularly, the controller 160 controls to capture a hand gesture image, compare the hand gesture image with the control images previously taken and stored in the memory, and execute, if a command or similar image is retrieved from the memory, a control command mapped to the control gesture image.

Figure 2:
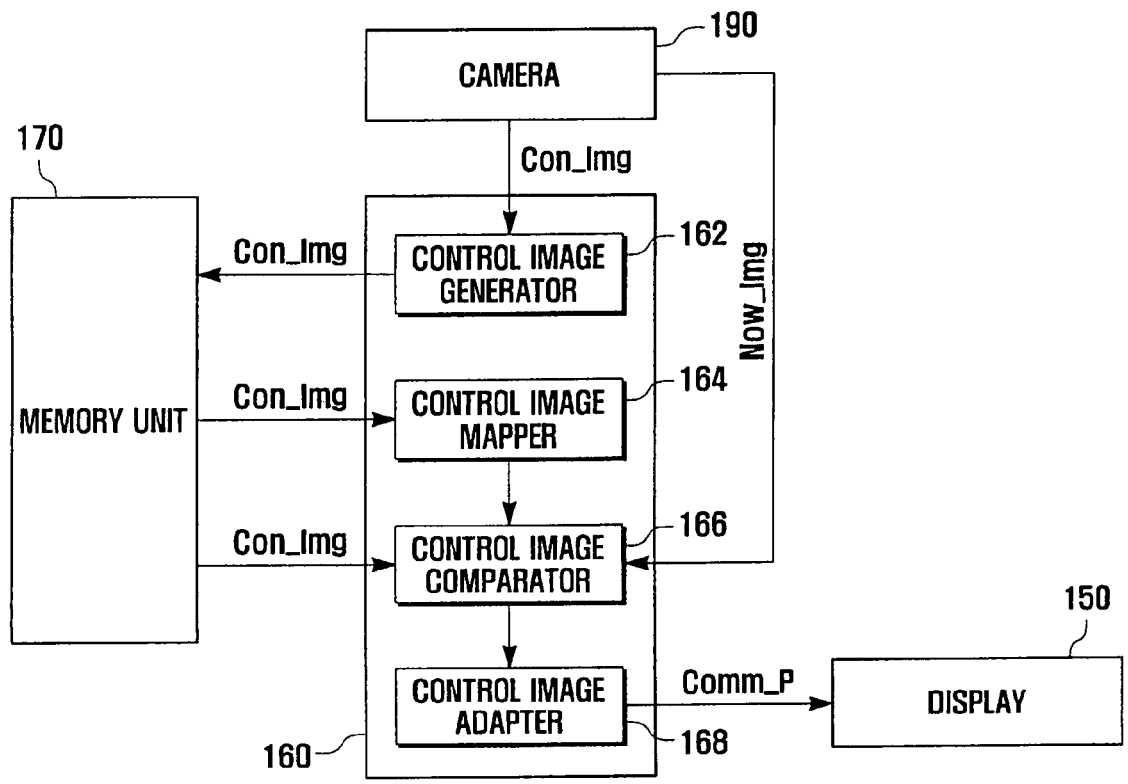
FIG. 2 is a block diagram illustrating a configuration of a controller of the hand gesture recognition input system of FIG. 1.

FIG. 2 is a block diagram illustrating a configuration of the controller of the hand gesture recognition input system of FIG. 1, and FIG. 3 is a lookup table illustrating mappings between control images and control commands according to an embodiment of the present invention. [FIGS. 3 and 5-7 will be objected due to blurred images. As such, please provide clean drawings showing lines in black and white.]

In FIG. 2, the controller 160 includes a control image generator 162 for controlling the camera 190 to capture the control images (Con_Img), a control image mapper 164 for mapping the control images (Con_Img) to the corresponding control commands (Comm_P), a control image comparator 166 for comparing command input images (Now_Img) currently taken by the camera 190 to the control images (Con_Img), and a control image adapter 168 for executing the control commands mapped to the control images (Con_Img).

In operation, the control image generator 162 selects the control images among images captured by the camera 190 and stores the control images into the memory unit 170. In more detail, the control image generator 162 controls the camera to capture hand gestures of the user as still images, and selects and store the control images (Con_Img) among the still images in the memory unit 170.

The control image mapper 164 links the collected control images (Con_Img) to the control commands (Comm_P) for controlling pointer operations in association with the menu options of the mobile phone.

The control commands (Comm_P) mapped to the control images (Con_Img) include a pointer activation command, layer navigation command for navigating between layers along a z axis in a three-dimensional coordinate space, plane navigation command for a movement of virtual work space on a screen, flip command for flipping an object such as a menu window, left click command corresponding to a left click of a mouse, and right click command corresponding to a right click of a mouse.

For example, the pointer activation command can be represented by a hand gesture image in which joints of fingers are bent except for the thumb and index fingers. If this hand gesture is input through the camera, the pointer moves on the screen of the display 150. If all the fingers are straight back, the movement of the pointer stops.

The layer navigation command is a command for navigating between the layers along the z axis in the three-dimensional space defined with x, y, and z axes. The layer navigation command is represented by a gesture moving a fist alternately towards and away from the camera.

The plane navigation command is a command for navigating horizontally between virtual menus on the same layer. The plane navigation command is represented by a gun-shaped hand gesture horizontally shaking the hand while the thumb is strait upwards and the index finger in a forward direction. That is, the plane navigation is performed on the same layer along the x axis.

The flip command is a command for flipping a window upside down when the window is provided with different working surfaces. The flip command is represented by a hand gesture flipping the hand.

The left and right clicks are similar to the left and right clicks of a mouse and are, respectively, represented by hand gestures of bending the index finger and of bending the thumb, respectively, at a predetermined angle.

As described above, the control image mapper 164 establishes mappings between the hand gestures and the control commands (Comm_P). Also, a combination of at least two hand gestures can be mapped to a control command, resulting in various representations of plural control commands.

For example, the pointer activation command can be represented by a transition from a hand gesture having straight fingers to another hand gesture of bending the fingers except for the thumb and index finger.

Also, other control commands can be represented with a hand gesture transition from an initial hand gesture.

The control image comparator 166 compares an image (Now_Img) currently captured by the camera 190 with the control images (Con_Img) mapped to the control commands (Comm_P) and determines whether the currently captured image is valid as corresponding to any of the control images. That is, the control image comparator 166 monitors the images (Now_Img) input through the camera 190 and detects similarities of the currently captured images (Now_Img) to the control images (Con_Img). If an image of which the similarity is in a tolerable range for any control image (Con_Img) is detected, the control image comparator 166 reports the valid command image to the control image adapter 168. The tolerable range is set for checking an offset between an input image (New_Img) and control images (Con_Img) regardless of a position of the hand. The offset between the two images are determined in association with a size of the hand and angles of the fingers, and expressed in an offset percentage. If the offset is in the tolerable percentage range, the control image comparator 166 determines an input of the control image (Con_Img). The control image comparator 166 compares the currently captured image (Now_Img) to the control images (Con_Img) using a wide tolerable range through a rough comparison process and then compares the currently captured image to the control images (Con_Img) selected at the rough comparison process through a fine comparison process.

The control image adapter 168 controls to execute the control command (Comm_P) mapped to the control image (Con_Img) determined by the control image comparator 166.

As described above, the hand gesture recognition input system of the present invention determines an input of a control image captured by a camera and executes a control command mapped to the control image. A procedure for executing the control command (Comm_P) is described hereinafter in association with a pointer operation on a menu screen.

Figure 4:
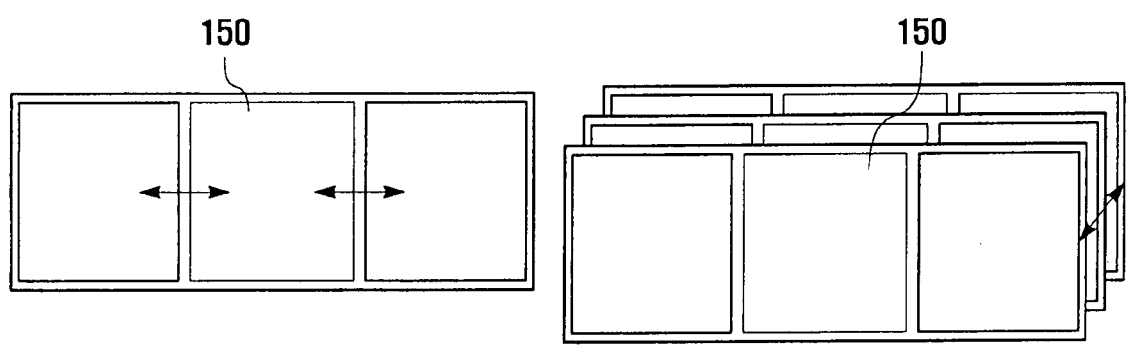
FIG. 4 is a conceptual view illustrating a three-dimensional virtual space having multiple layers for a hand gesture recognition input system according to an embodiment of the present invention.

FIG. 4 is a conceptual view illustrating a three-dimensional virtual space having multiple layers for a hand gesture recognition input system according to an embodiment of the present invention.

Referring to FIG. 4, a menu window includes view sections that are horizontally elongated. A plural menu windows are arranged on different layers arranged along the z axis in the three dimensional virtual space so as to efficiently secure a sufficient space for showing the plural menu windows.

If a menu window is selected, the selected menu window is activated such that the layer on which the selected menu window is arranged becomes the uppermost layer. In this case, other layers having deactivated menu windows are arranged below the uppermost layer.

Figure 5A:
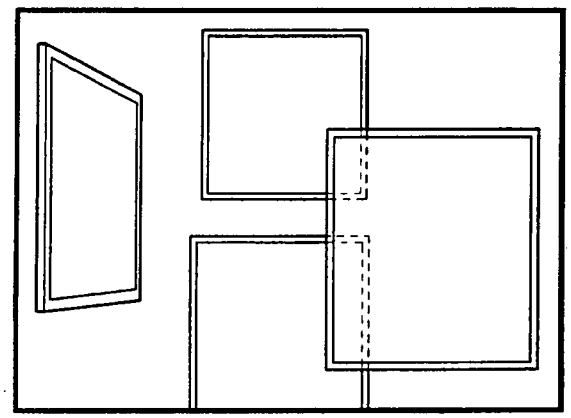
FIGS. 5a and 5b are screen images illustrating menu windows arranged on a single layer in a virtual space having depth along a z axis according to an embodiment of the present invention.
Figure 5B:
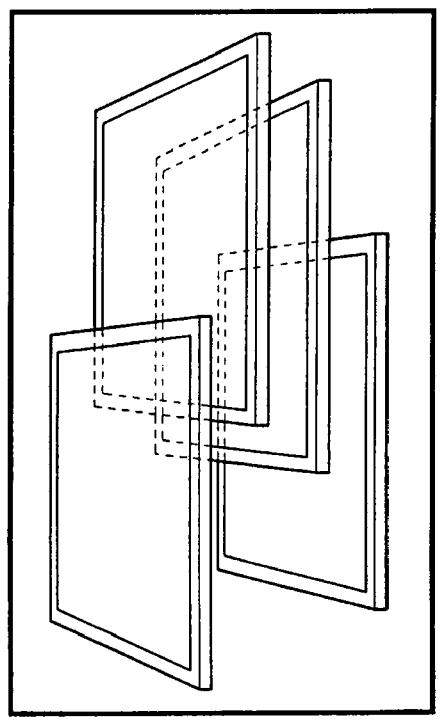

FIGS. 5a and 5b are screen images illustrating a menu windows arranged on a single layer in a virtual space having depth along a z axis according to an embodiment of the present invention.

Referring to FIG. 5a, the menu windows are arranged at different depths in a layer. A menu window activated by a pointer manipulation floats to a top surface of the single layer and other windows are deactivated to be arranged at different depths below the activated menu window.

Referring to FIG. 5b, the menu windows can be arranged so as to be shown as a perspective view of laminated layers. In this case, a menu window is activated so as to floats to the top surface of the screen. The menu windows can be represented by icons presented in a toolbar. In a three dimensional (3-D) shell, the uppermost layer may be provided with multiple layers rather than the single layer.

Figure 6:
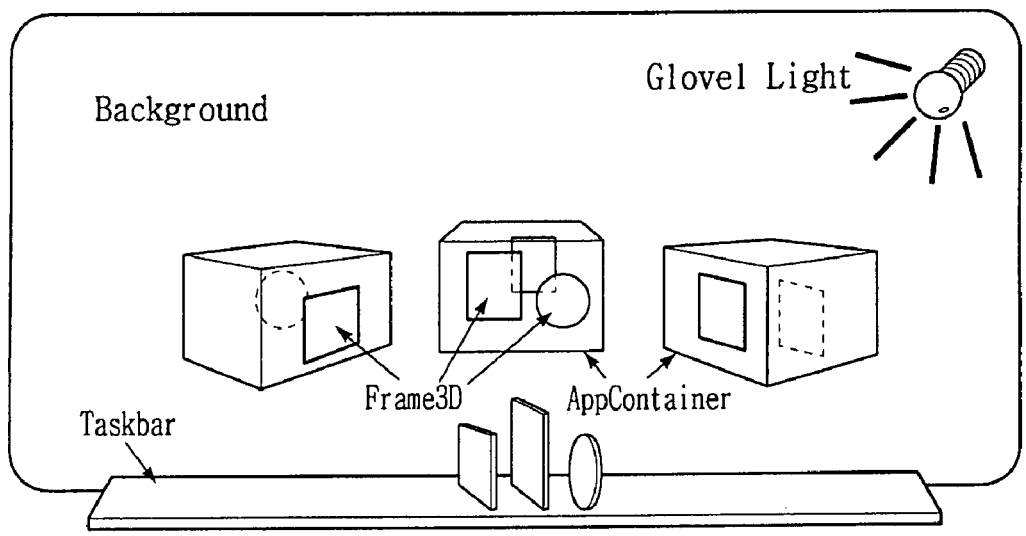
FIG. 6 is a screen image illustrating a task bar displayed on a screen of a display of the hand gesture recognition input system according to an embodiment of the present invention.
Figure 7:
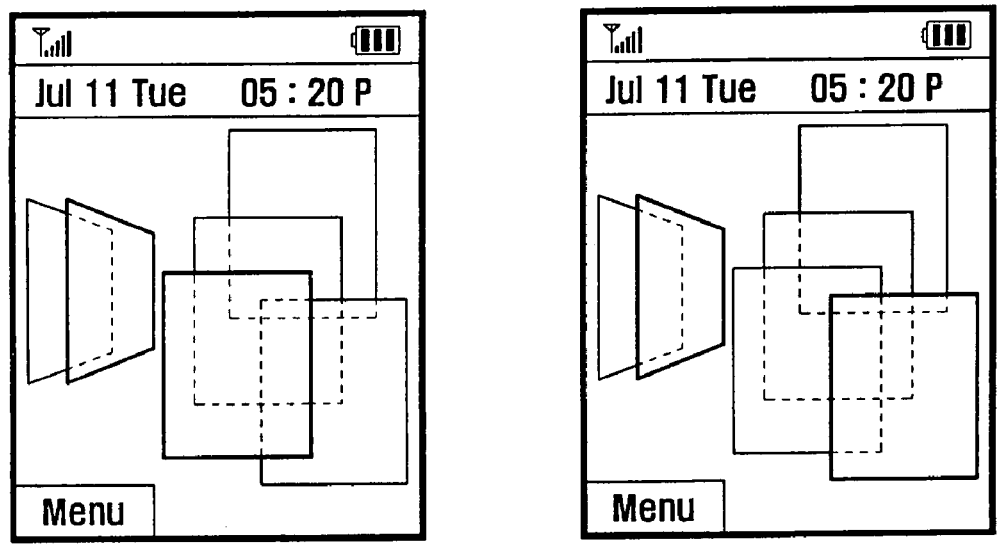
FIG. 7 shows screen images illustrating arrangements of program menu windows on a screen of a display of the hand gesture recognition input system according to an embodiment of the present invention.

FIG. 6 is a screen image illustrating a task bar displayed on a screen display of a hand gesture recognition input system according to an embodiment of the present invention, and FIG. 7 shows screen images illustrating the arrangements of program menu windows on a screen display of a hand gesture recognition input system according to an embodiment of the present invention.

Referring to FIGS. 6 and 7, the menu screen of the hand gesture recognition input system provides a toolbar presenting icons, i.e. shortcut icons for executing application programs and function icons for activating menu windows, and showing view region navigation on the activated menu window. The view region navigation icon shows a location of a current view region in the three dimensional space provided by the 3-D shell. The view region conversion can be performed by selecting one of the regions presented on the view region navigation icon. If a shortcut icon is selected from the toolbar, an application program represented by the shortcut icon is executed. The toolbar shows the icons representing the menu windows residing on the current layer. The toolbar can present the icons and menu windows in the forms of avatars.

Although the hand gesture recognition input system is schematically depicted in FIG. 1 for simplifying the explanation, the present invention is not limited to this configuration, and the hand gesture recognition input system can further include a keypad for manipulating the operation of the camera, audio processing unit for processing audio signal generated while operating the camera and sound effect generated when activating a menu, a radio frequency (RF) unit for supporting communication of the mobile phone, wireless local area network module, and digital broadcast receiver.

Figure 8:
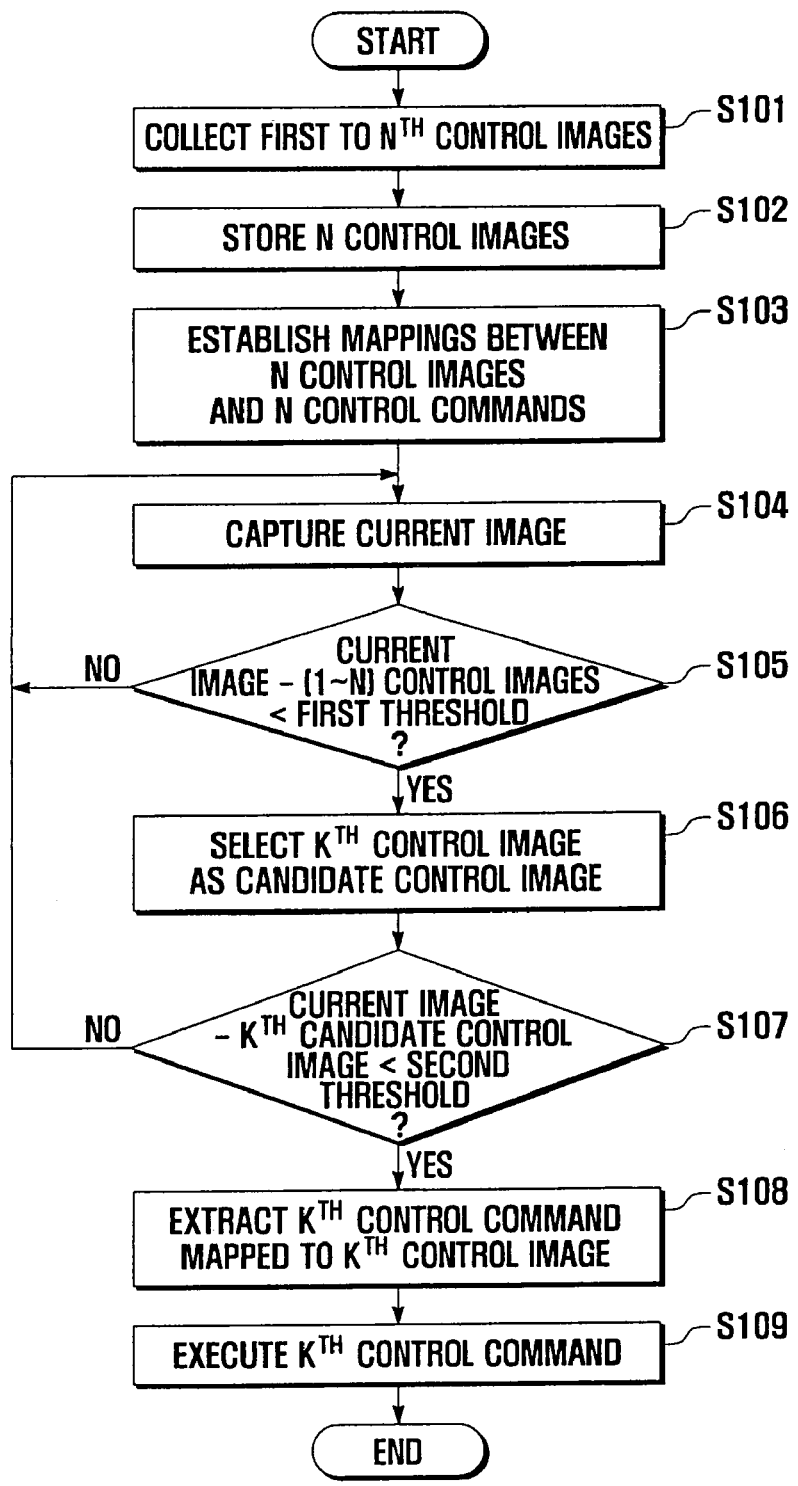
FIG. 8 is a flowchart illustrating a hand gesture recognition input method for a mobile phone according to an embodiment of the present invention.

FIG. 8 is a flowchart illustrating a hand gesture recognition input method for a mobile phone according to an embodiment of the present invention.

Referring to FIG. 8, the controller 160 collects a first to $n^{th}$ control images (Con_Img) by means of the camera 190 (S101). The control images can be differentiated from each other so as to be used for different control commands (Comm_P). For example, when hand gesture images are used for the control images (Con_Img), the control images (Con_Img) should be distinguished by the shapes of fingers and changes of the hand shapes. In order to improve the distinguishability of the control images, a time duration of maintaining an identical hand gesture can be used. If an identical hand gesture is maintained for a predetermined duration, the controller 160 determines the hand gesture image as a control image. The control image may consist of more than one gesture image changing from one to another. That is, the control image can be a motion picture in which an initial hand gesture is changed into a final hand gesture. Also, there can be at least one intermediate hand gesture between the initial hand gesture and final hand gesture. Here, n is a natural number equal to and greater than 1.

After collecting the n control images, the controller 160 stores the n collected control images in the memory 170 unit (S102). Preferably, the control images are stored in the form of a lookup table providing a control image field.

Next, the controller 160 establishes mappings between the first to $n^{th}$ control images and a first to $n^{th}$ control commands (Comm_P) in the lookup table (S103). The control commands include system operation-related commands and application control commands. In order to map the control images and control commands uniquely, n control images are prepared and the number of the control commands is also n.

The controller 160 can recognize a command input by constructing the lookup table as above and comparing a currently captured image with the control images stored in the lookup table.

In this embodiment, the control images are mapped to pointer manipulation control commands, for example a point activation command, layer navigation command for navigating between layers along a z axis in a three-dimensional coordinate space, plane navigation command for a movement of virtual work space on a screen, flip command for flipping an object such as a menu window, left click command corresponding to a left click of a mouse, and right click command corresponding to a right click of a mouse.

After mapping the control images and control commands, the controller 160 captures the current image taken by the camera 190 (S104), and compares the current image (Now_Img) and the control images registered in the lookup table so as to determines whether a control image to which an offset of the current image (Now_Img) is less than a first threshold offset (S105). The first offset is set to have a large value so as to roughly match the current image (Now_Img) and the control images (Con_Img).

If there is no control image matching the current image (Now_Img) in the first threshold offset, the controller 160 repeat the step S104.

If a $K^{th}$ image among the first to $n^{th}$ control images matches the current image (Now_Img), the controller 160 selects the $K^{th}$ control image as a candidate control image (S106). At step S105, more than one candidate control images can be selected.

After selecting the candidate control image, the controller 160 determines whether there is a control image to which an offset of the current image (Now_Img) is less than a second threshold offset (S107).

The second threshold offset is less than the first threshold offset for the fine comparison. The second threshold offset can be determined on the basis of an experiment result and in consideration of the characteristics of the control images (Con_Img). That is, when the distinguishability between the control images is very low due to a large number of the control images being used for the control commands, the second threshold offset is set to a very low value for improving the comparison sensitivity. If a small number of control commands are involved, the second threshold offset is set to a relatively high value so as to increase control image retrieval speed.

If there is a candidate control image, i.e. the $K^{th}$ control image, to which an offset of the current image (Now_Img) is less than a second threshold offset, the controller 10 selects the candidate control image as a target control image and extracts a control command mapped to the target control image, i.e. the $K^{th}$ control image (S108).

Next, the controller 160 executes the $K^{th}$ control command so as to operate the mobile phone or an application program thereof (S109). For example, if the $K^{th}$ control command is a pointer operation-related and left click event-related control command, the controller 160 generates a control signal designated for a left click of a mouse.

In a similar manner, the controller 160 controls the operations of the pointer related to the point activation command, layer navigation command, plane navigation command, flip command, and right click command on the screen of the display 150. The pointer operations are performed with the menu windows arranged in the three-dimensional coordinate space as described above.

In the present invention, the user inputs control commands represented by hand gestures captured by the camera 190 so as to perform various menu related operations, such as menu window activation, inter-menu window navigation, sub-menu activation, menu option navigation, menu icon selection and activation.

In this embodiment, the comparison between the current image (Now_Img) and the control images (Con_Img) is performed in two steps with two threshold offset values for improving the image comparison process, however, the present invention is not limited thereto, and can be implemented with three or more threshold values. The number of the comparison steps can be changed in consideration of hardware characteristics of the controller 160.

The hand gesture recognition input system and method of the present invention can be added to the mobile phone as an additional operation mode such that the user selectively uses the hand gesture recognition input mode. That is, the mobile phone can be implemented with a hand gesture recognition input mode together with a keypad input mode and touchpad input mode such that the user can select any of the three input modes.

As described above, the hand gesture recognition input system and method of the present invention enable input of control commands by hand gesture images captured by a camera, thereby improving input manipulation convenience. Also, the hand gesture recognition input system and method of the present invention are implemented with a three-dimensional virtual space in which menu windows are arranged at different depths, thereby improving a space utilization efficiency for displaying the menu windows.

Although exemplary embodiments of the present invention are described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An input method for a mobile phone, comprising:
   storing a plurality of images as control images;
   mapping the control images to corresponding control commands;
   capturing an image taken by a camera as a current image;
   comparing the captured current image to the control images;
   selecting one of the control images as a target control image according to a comparison result;
   extracting a control command corresponding to the target control image; and
   executing the control command:
   wherein selecting one of the control images as a target control image comprises:
   determining whether a difference offset between the current image and the control images are less than a first threshold offset;
   selecting the control images of which difference offset with the current image as candidate control images;
   determining whether a difference offset between the current image and the candidate control images are less than a second threshold offset; and
   selecting, if there is a candidate control image of which difference offset with the current image, the candidate control image as the target control image.

2. The input method of claim 1, wherein the control images are hand gesture images.

3. The input method of claim 1, wherein the control commands are commands for controlling pointer operations on a screen of the mobile phone.

4. The input method of claim 3, wherein the pointer operations comprise:
   pointer activation, inter-layer navigation, inter-window navigation on an identical layer, object flip, left click, and right click, in a three dimensional coordinate space defined with x, y, and z axes.

5. The input method of claim 1, wherein mapping the control images to corresponding control commands comprises: building a lookup table having an index field, a control image filed, and control command field.

6. The input method of claim 1, wherein executing the control command comprises:
   turning on a screen of the mobile phone;
   activating menu windows on the screen;
   activating a pointer; and
   controlling the pointer to executing a specific operation in association with the menu windows.

7. The input method of claim 6, wherein the screen is implemented with a virtual three-dimensional space having a depth such that the menu windows are arranged in different depths or are arranged in the form of a perspective view.

8. The input method of claim 6, wherein the screen presents shortcut icons for executing application programs, a navigation icon for indicating a current user view, and an icon list representing menu windows on a currently activated layer.

9. An input system for a mobile phone, comprising:
   a camera for taking images to be used as control images and capturing an input image;
   a memory for storing the control images and control commands mapped to the control images and for temporarily storing the input image;
   a screen for displaying at least one menu window and operations of the menu window in accordance with the control commands; and
   a controller for controlling a menu window operation in accordance with a control command selected by comparing the input image and the control images;
   wherein selecting one of the control images as a target control image comprises:
   determining whether a difference offset between the current image and the control images are less than a first threshold offset;
   selecting the control images of which difference offset with the current image as candidate control images;

determining whether a difference offset between the current image and the candidate control images are less than a second threshold offset; and selecting, if there is a candidate control image of which difference offset with the current image, the candidate control image as the target control image.

10. The input system of claim 9, wherein the controller comprises:

an image generator for generating the control images from images taken by the camera;

a control image mapper for mapping the control images to the control commands;

an image comparator for selecting a target control image by comparing the input image with the control images; and a control image adapter for executing the control commands mapped to the target control image.

11. The input system of claim 9, wherein the screen is implemented with a virtual three-dimensional space having a depth such that the menu windows are arranged in different depths or are arranged in the form of a perspective view.

12. The input system of claim 9, wherein the screen presents shortcut icons for executing application programs, a navigation icon for indicating a current user view, and an icon list representing menu windows on a currently activated layer.

13. The input system of claim 9, wherein the controller controls a pointer for operations of the at least one menu window.

14. The input system of claim 13, wherein the control command comprises a pointer activation command, inter-layer navigation command, inter-window navigation command, object flip command, left click command, and right click command, in a three-dimensional coordinate space defined with x, y, and z axes.

* * * * *